US006823548B2

(12) United States Patent
Murphy et al.

(10) Patent No.: US 6,823,548 B2
(45) Date of Patent: Nov. 30, 2004

(54) COMPOSITE FIRE BARRIER AND THERMAL INSULATION FABRIC FOR MATTRESSES AND MATTRESS FOUNDATIONS

(75) Inventors: Harrison Robert Murphy, Great Falls, VA (US); Juraj Michal Daniel Slavik, II, McLean, VA (US)

(73) Assignee: Spungold, Inc., Great Falls, VA (US)

(*) Notice: Subject to any disclaimer, the term of this patent is extended or adjusted under 35 U.S.C. 154(b) by 0 days.

(21) Appl. No.: 10/291,879

(22) Filed: Nov. 8, 2002

(65) Prior Publication Data

US 2004/0060119 A1 Apr. 1, 2004

Related U.S. Application Data

(60) Provisional application No. 60/414,994, filed on Oct. 1, 2002.

(51) Int. Cl.[7] ................................................. A47C 5/12
(52) U.S. Cl. .............................................. 5/698; 5/690
(58) Field of Search ..................................... 5/698, 690

(56) References Cited

U.S. PATENT DOCUMENTS

| | | | | |
|---|---|---|---|---|
| 4,504,991 A | * | 3/1985 | Klancnik | 5/698 |
| 4,801,493 A | * | 1/1989 | Ferziger et al. | 442/123 |
| 5,279,878 A | | 1/1994 | Föttinger et al. | 428/102 |
| 5,645,926 A | | 7/1997 | Horrocks et al. | 442/234 |
| 5,935,882 A | | 8/1999 | Fujita et al. | 442/247 |
| 5,972,512 A | * | 10/1999 | Boisvert et al. | 428/409 |

FOREIGN PATENT DOCUMENTS

| | | |
|---|---|---|
| GB | 2 293 572 A | 9/1996 |
| WO | WO 03/023108 A1 | 3/2003 |

OTHER PUBLICATIONS

Itzhak, et al., "Predicting The Thermal Protective Performance of Heat–Protective Fabrics from Basic Properties", ASTM Spec. Tech Publ 1986 ASTM, Philadelphia, PA, USA, pp. 358–375. (Abstract only).

Horrocks, Richard A. "Developments in Flame Retardants for Heat and Fire Resistant Textiles the Role of Char Formation and Intumescence", Polym Degradation Stab; Polymer Degradastion and Stability Nov.–Dec. 1996 Elsevier Science Ltd, Oxford, England, vol. 54, No. 2–3, Sep. 1995, pp. 143–154. (Abtract only).

* cited by examiner

*Primary Examiner*—Teri Pham Luu
*Assistant Examiner*—Fredrick Conley
(74) *Attorney, Agent, or Firm*—Heslin Rothenberg Farley & Mesiti P.C.; Mary Louise Gioeni, Esq.

(57) ABSTRACT

A composite fire barrier fabric including a fire barrier layer and a thermally insulating layer at least partially encloses the core of an open flame resistant mattress. The fire barrier layer and thermally insulating layer are composed of at least one flame-retardant fiber, and not necessarily the same flame retardant fiber. When tested in accordance with the flame resistance test protocols of NFPA 267 or ASTM E 1590, the mattress has a maximum heat release rate of less than 250 kW and a total energy release of less than 40 MJ in the first five minutes of the test.

30 Claims, 3 Drawing Sheets

COMPOSITE FIRE BARRIER AND THERMAL INSULATION FABRIC FOR MATTRESSES AND MATTRESS FOUNDATIONS

CROSS-REFERENCE TO RELATED APPLICATIONS

This application claims priority from U.S. provisional application, Ser. No. 60/414,994, filed Oct. 1, 2002, the entire disclosure of which is incorporated herein by reference.

TECHNICAL FIELD

The invention relates to open flame resistant mattresses and mattress foundations protected by a fire barrier/thermally insulating fabric.

BACKGROUND OF THE INVENTION

The importance of preventing mattress fires in institutional settings has been recognized for many years, and a number of standards for flame retardance of these mattresses have been promulgated. A federal performance standard applicable to mattresses on a nationwide basis is codified in 16 CFR Part 1632 (Standard for Flammability of Mattresses and Mattress Pads), customarily referred to as the Cigarette Ignition Standard, the entire contents of which are incorporated herein by reference. However, even when mattresses meet the requirements of the Cigarette Ignition Standard, these can react with volatile and potentially deadly results when exposed to open-flame and smoldering ignition sources. The result can be a fire with sufficient energy to cause an average size room to reach a state of total instantaneous combustion or flashover. The California Bureau of Home Furnishings and Thermal Insulation has addressed the hazards associated with the ignition of mattresses in public institutions with California Technical Bulletin #129 (hereinafter 'TB 129'), published as a draft standard in 1992. It has since been adopted as a voluntary consensus standard by the American Society of Testing and Materials as ASTM E-1590 and the National Fire Protection Association (NFPA) as NFPA 267. (ASTM E-1590 and NFPA 267 use essentially the same test protocol as TB 129 but contain no failure criteria.) The standard has also been embodied in NFPA's Life Safety Code 2000, section 10.3.4, and in Underwriter's Laboratories' UL 1895.

Although hazards in public institutions have been addressed with standards based on TB 129, the number of injuries and fatalities associated with residential fires in which a mattress was the first item ignited or the mattress exacerbated the fire event has led to efforts to reduce flammability of mattresses used in homes. One notable event is the passage of Assembly Bill 603 in the California Legislature of Assembly. The bill calls for virtually all mattresses and sleep surfaces sold in the State of California, as of Jan. 1, 2004 to meet an open flame resistance standard. In addition, the Consumer Products Safety Commission is currently developing new regulations for further reducing mattress flammability beyond the level required by the Cigarette Ignition Standards. This was announced recently in the Federal Register (Advance Notice of Public Rule Making (ANPR) published Oct. 11, 2001)).

New standards for flammability of residential mattresses will require new materials and methods of manufacturing these, as mattresses targeted for residential markets differ significantly from those typically used in institutions. Institutional bedding installations typically require only a mattress and no foundation; mattress may be simply a solid core of polyurethane foam, which may be combustion modified to some degree as well. Many of the components used in institutional mattresses and sleep support surfaces, including fill materials and covering fabrics are subject to performance testing according to test criteria such as NFPA 701 and California Technical Bulletin No. 117.

In contrast to institutional bedding, residential sleep surfaces are typically covered and filled with a number of potentially volatile components, including polyurethane foam, highly combustible ticking fabrics, insulator padding, and pockets or cavities of air that can serve to feed an ignition source such as a candle, match, lighter, faulty electric socket, tipped over lamp or smoldering cigarette. For instance, pillow-top constructions feature additional layers of filling materials contained in layers on the panel surfaces, and set off aesthetically from the basic mattress design by gussets or seam lines in the case of the box-top approach. Gussets create thin lines of highly volatile fill materials and add more gaps and crevasses that can trap and concentrate heat and flame. A crowned/convex shape for the sleep surface or mattress panel also creates crevasses or voids between a mattress and foundation, again providing areas that can trap heat and flames and concentrates these on small areas. Also, the presence of a foundation does not provide an easy escape path for dissipation of heat across and beyond the bottom of the mattress. Super heating in the air cavity within the mattress and/or foundation can lead to what has been referred to as a flashover event.

One approach to reducing flammability of mattresses used in residential settings has been to treat fabrics used in their construction with chemical flame retardants. However, these chemical treatments may be objectionable because of distasteful odors which are noticeable when in close contact with the materials, off-gassing obnoxious elements, stiffness of the fabric caused by such treatments, which may compromise the comfort of the finished mattress or mattress foundation, and the potential temporary durability of such treatments, which may compromise the long term protection from open-flame, smoldering ignition and radiant/thermal heat flux sources. Other attempts to reducing flammability of fabrics have been only partly successful, and there are no materials commercially available for use in mattress that can reduce flammability of a sleep set including a mattress and foundation to a level where the requirements of TB 129 can be met.

For example, U.S. Pat. No. 4,504,991, to Klancnik, relates to a fire-resistant mattress that includes a flame-retardant composite. The composite is a two-layered material, made up of a flame-retardant material that forms a char when exposed to fire and a layer of high tensile strength material. The flammable materials of the mattress are enclosed by the composite. In the single embodiment disclosed, the composite is made up of a neoprene foam bonded to a fiberglass fabric.

U.S. Pat. No. 5,578,368, to Forsten, relates to a fire-resistant fiberfill material for use in sleeping bags, comforters, wearing apparel, upholstered furniture, and mattress tops. The material is composed of a fiberfill batt having little fire-resistance with an aramid fabric contacting the fiberfill layer.

U.S. Pat. No. 4,092,752, to Dougan, relates to a mattress enclosed with a flame-retardant polyurethane foam having an optional layer of polyimide foam.

U.S. Pat. Nos. 6,146,759 and 6,410,140, to Land, relate to a flame-retardant corespun yarn and fabrics incorporating them for applications such as mattress tickings.

Leggett & Platt, Inc. and Zoltek Companies, Inc. announced on Oct. 17, 2002 a family of fire-resistant products called PYRO GON® as an engineered blend of polyester and PYRON® fibers for use in mattresses and bedding. PYRON® is an oxidized polyacrylonitrile fiber.

However, none of these solutions is capable of imparting sufficient and consistent flame-retardant characteristics to the full breadth of styles and constructions of bedding typically used in the home, that is, a comfortable mattress placed atop a foundation, both containing a significant amount of flammable material. As a result, there is a need for new materials to protect residential mattress sets from fire, and especially for material in use in manufacturing mattress than can meet the more stringent flammability standards expected to be imposed on the residential market, such as TB 129.

SUMMARY OF THE INVENTION

It has been unexpectedly discovered that a composite flame retardant fabric, composed of a flame retardant fire barrier layer and a thermally insulating layer, can dramatically reduce flammability of a mattress or mattress set constructed therewith such a mattress or mattress set that is covered or partially covered with the composite fabric can meet the stringent new standards for flammability of mattresses and mattress sets for the residential market set by TB 129, and its equivalents.

DETAILED DESCRIPTION OF THE INVENTION

Figure 1:
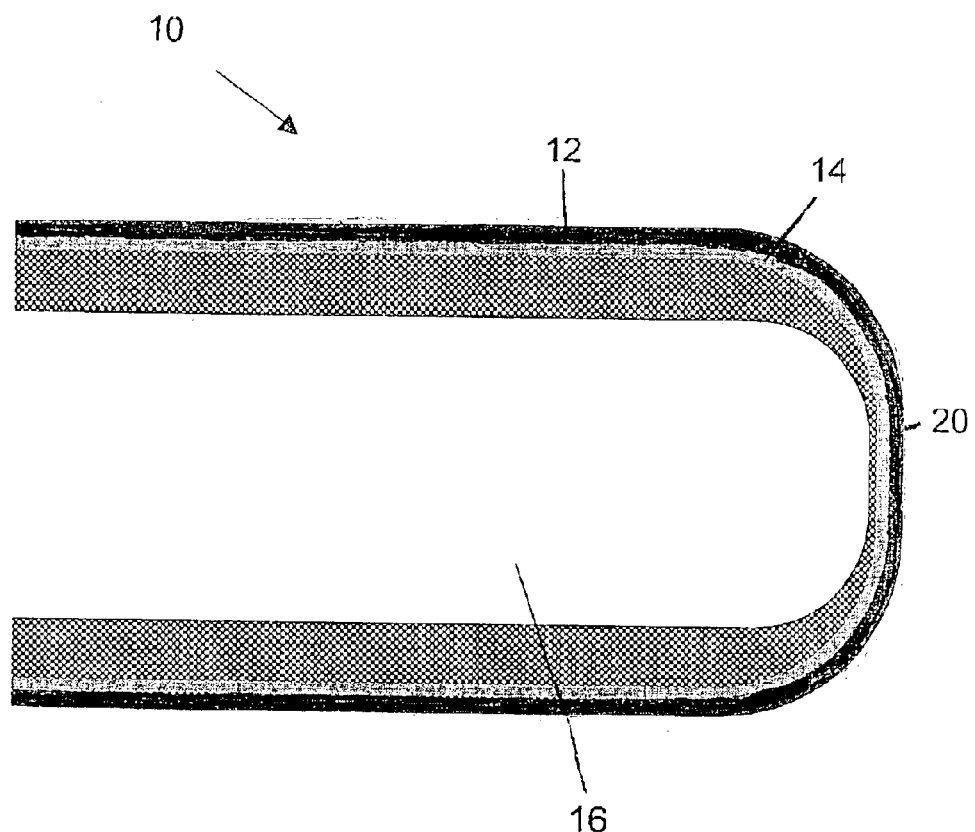
FIG. 1 is a cross-sectional view of open flame-resistant mattress according to the present invention.

The present invention relates to open-flame resistant mattresses and mattress sets, and to fire barrier fabrics that at least partly enclose these mattresses and/or foundations thereof. In the context of the present invention, terms relating to mattresses are defined in conformity with terms as defined by 16 C.F.R. 1632, and as follows:

"(a) Mattress means a ticking filled with a resilient material used alone or in combination with other products intended or promoted for sleeping upon.
  (1) This definition includes, but is not limited to, adult mattresses, youth mattresses, crib mattresses including portable crib mattresses, bunk bed mattresses, futons, water beds and air mattresses which contain upholstery material between the ticking and the mattress core, and any detachable mattresses used in any item of upholstered furniture such as convertible sofa bed mattresses, corner group mattresses, day bed mattresses, roll-a-way bed mattresses, high risers, and trundle bed mattresses. See Sec. 1632.8 Glossary of terms, for definitions of these items.
  (2) This definition excludes sleeping bags, pillows, mattress foundations, liquid and gaseous filled tickings such as water beds and air mattresses which do not contain upholstery material between the ticking and the mattress core, upholstered furniture which does not contain a detachable mattress such as chaise lounges, drop-arm love seats, press-back lounges, push-back sofas, sleep lounges, sofa beds (including jackknife sofa beds), sofa lounges (including glide-outs), studio couches and studio divans (including twin studio divans and studio beds), and juvenile product pads such as car bed pads, carriage pads, basket pads, infant carrier and lounge pads, dressing table pads, stroller pads, crib bumpers, and playpen pads. See Sec. 1632.8 Glossary of terms, for definitions of these items.

(b) Mattress Pad means a thin, flat mat or cushion, and/or ticking filled with resilient material for use on top of a mattress. This definition includes, but is not limited to, absorbent mattress pads, flat decubitus pads, and convoluted foam pads which are totally enclosed in ticking. This definition excludes convoluted foam pads which are not totally encased in ticking.

(c) Ticking means the outermost layer of fabric or related material that encloses the core and upholstery materials of a mattress or mattress pad. A mattress ticking may consist of several layers of fabric or related materials quilted together.

(d) Core means the main support system that may be present in a mattress, such as springs, foam, hair block, water bladder, air bladder, or resilient filling.

(e) Upholstery material means all material, either loose or attached, between the mattress or mattress pad ticking and the core of a mattress, if a core is present.

(f) Tape edge (edge) means the seam or border edge of a mattress or mattress pad.

(g) Quilted means stitched with thread or by fusion through the ticking and one or more layers of upholstery material.

(h) Tufted means buttoned or laced through the ticking and upholstery material and/or core, or having the ticking and upholstery material and/or core drawn together at intervals by any other method which produces a series of depressions on the surface." (16CFR1632.2)

"(r) Mattress foundation. Consists of any surface such as foam, box springs or other, upon which a mattress is placed to lend it support for use in sleeping upon." (16CFR1632.8)

FIG. 1 is a cross-sectional view of one embodiment of the invention, flame-resistant mattress 10, which is composed of ticking cover fabric 12, ticking filling materials 14 and core 16. Core 16 is enclosed by fire barrier fabric 20, which is shown in greater detail in FIG. 3. In this embodiment, as fire barrier fabric 20 is positioned between ticking cover fabric 12 and ticking filling materials 14, it also encloses the filling materials associated with the ticking, and may be considered a part of the ticking of mattress 10. Alternate embodiments, wherein fire barrier fabric 20 is positioned beneath a multilayer ticking composed of a cover fabric and filling materials, are also considered within the scope of the invention. Resistance of mattress 10 to ignition after exposure to an open flame may be determined by full-scale testing in accordance with NFPA 267, 2003 edition, ASTM E 1590, or TB 129. Test protocols of each of these standards are essentially the same, and the entire contents of each test method are incorporated herein by reference. Results of testing a mattress according to the present invention according to such test protocols typically show a maximum heat release rate of less than 250 kW and a total energy release of less than 40 MJ in the first five minutes of the test. In some embodiments of the invention, even better results may be obtained, as follows: maximum heat release rate of less than 100 kW, total heat release of less that 25 MJ in the first ten minutes of the test and weight loss due to combustion of less than 3 pounds in the first ten minutes of the test.

Figure 2:
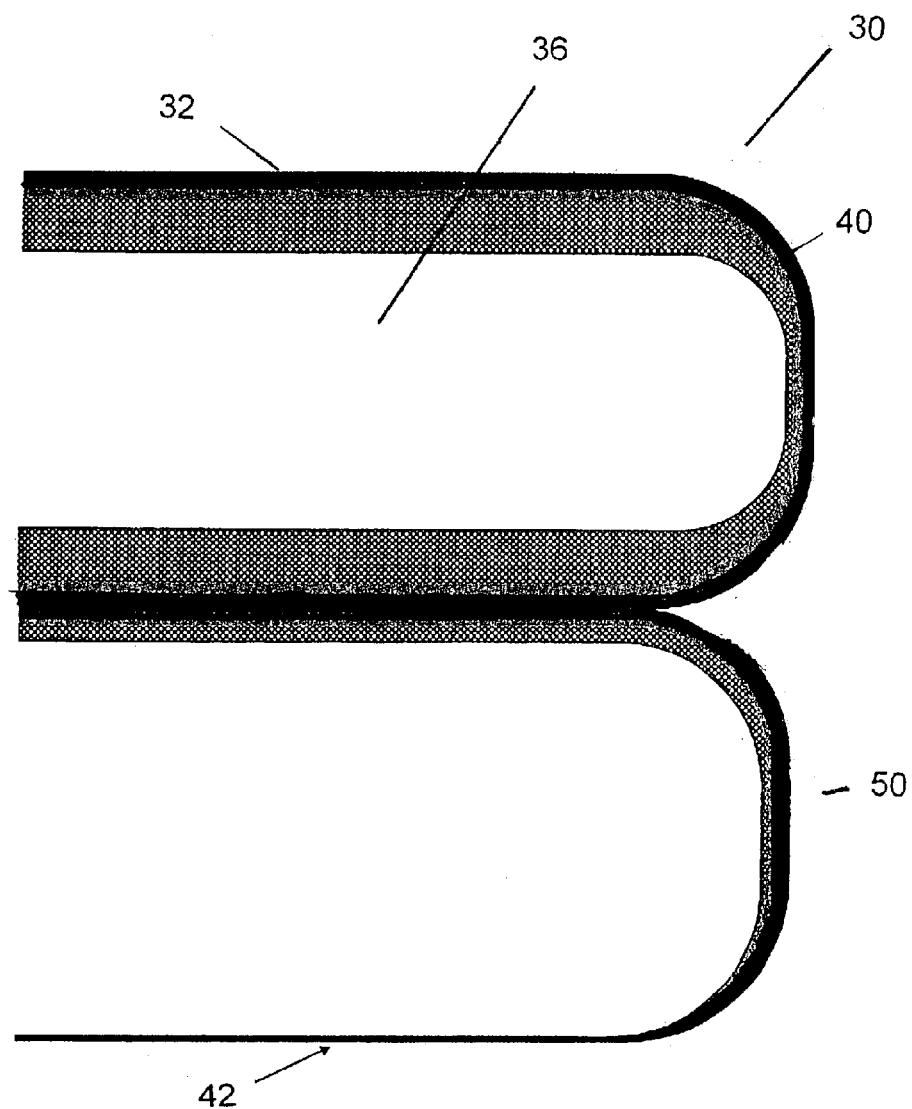
FIG. 2 is a cross-sectional view of a mattress set according to the present invention, including a mattress and foundation, each enclosed by fire barrier fabrics.

FIG. 2 shows another embodiment of the invention, mattress set 30, composed of mattress 32 and foundation 42. Mattress core 36 is enclosed by fire barrier fabric 40 and foundation 42 is enclosed by fire barrier fabric 50. Fire barrier fabrics 40 and 50 may have different compositions because of the difference in fuel load and flammability of mattress 32 and foundation 42. Mattress set 30 typically returns results similar to those above in full-scale open flame testing, that is maximum heat release rate of less than 250 kW and a total energy release of less than 40 MJ in the first five minutes of the test, and in some embodiments, maximum heat release rate of less than 100 kW, total heat release of less that 25 MJ in the first ten minutes of the test and weight loss due to combustion of less than 3 pounds in the first ten minutes of the test.

Figure 3:
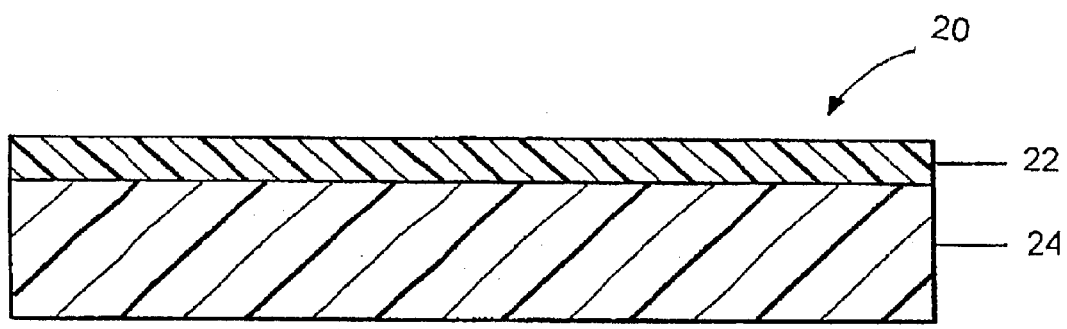
FIG. 3 is a schematic, cross sectional view of a fire barrier fabric according to the present invention, showing the fire barrier layer and thermally insulating layer.

FIG. 3 shows a schematic view of a preferred embodiment of fire barrier fabric 20, including fire barrier layer 22 and thermally insulating layer 24, each of which independently comprise or are composed of at least one char-forming flame-retardant fiber. In the context of the invention, "independently comprise or are composed of at least one char-forming flame-retardant fiber" means that fire barrier layer 22 and thermally insulating layer 24 may have the same fiber composition, that is, may be composed of the same fiber or blend of fibers, or may have different fiber compositions.

A fire barrier fabric according to the present invention functions to protect a mattress and/or foundation from fire by forming a char when exposed to an ignition source. In the context of the present invention, the term 'char' is defined as a residue formed from material that has been exposed to heat and/or flame, and which is no longer flammable. The char may be formed from materials that have been incompletely burned and extinguished, or from materials that do not react chemically under conditions found in a fire, and so, are not flammable, such as fiberglass. The char may also possess mechanical strength and integrity and so can act as a physical barrier to prevent flames from contacting highly combustible interior fill components of mattresses and mattress foundations. In addition, it is desirable that the char should not melt, drip or shrink away from the ignition source, or display significant after-flame, or support these reactions at a level sufficient to cause ignition of adjacent materials.

Accordingly, the fire barrier layer and thermally insulating layer are each composed of at least one char-forming flame-retardant fiber. The layers may be composed of the same fiber or different fibers. Any char-forming flame retardant fiber may be used for either layer, and the following fibers have been found to be particularly useful: aramids, including para-aramids (poly(p-phenylene terephthalamide), e.g., KEVLAR® (Dupont Corporation) and TWARON® (Teijin Twaron BV) and meta-aramids (poly(m-phenylene isophthalamide), such as Nomex® (Dupont Corporation); fiberglass; melamines such as BASOFIL® (BASF); poly-benzimidazole (PBI) (Celanese Acetate A.G); oxidized polyacrylonitrile (PAN); novoloids, such as KYNOL® (American Kynol, Inc); pre-oxidized fibers and carbon fibers, modacrylics, such as, e.g., KANECERON® and PROTEX® (Kaneka) and LUFNEN® (Kanebo Goshen), FR (fire- or flame-resisting, -resistant, -retarding or -retardant) rayon, FR viscose, such as, e.g., VISIL® (Sateri Oy) and LENZING FR® (Lenzing AG, Fibers Division), wool and FR-treated cotton. It should be noted that these fibers are merely exemplary, and other fire-retardant fibers that form a char, including fibers that are developed in the future may be used. Additionally, certain proprietary modacrylic fibers that release extinguishing/oxygen depriving elements such as antimony when exposed to an ignition source may be used. This chemical reaction may assist in snuffing out small flames that may occur on adjacent, non-FR components such as the mattress covering fabric or ticking. Blends that include at least one fire-retardant fiber that form a char may also be used. The blends may include one or more structure-providing char-forming fire-retardant fibers, FR-treated fibers, such as FR-treated polyester, and non-FR fibers. For example, in one embodiment, the fire barrier layer is composed of a blend of aramid and modacrylic fibers and the thermally insulating layer is composed of a blend of FR viscose and modacrylic fibers. Aramid-modacrylic blends typically contain 5–25% para-aramid fiber and 75–95% modacrylic fiber, and flame-retardant viscose-modacrylic blends, 50–75% FR Viscose and 25–50% modacrylic fibers. Non-flame-resistant polyester is typically used as a carrier fiber for manufacturing fiberglass fabrics, and these fabrics may contain 10% of a polyester fiber, and up to 50% of that fiber.

At least one of the fire barrier layer and thermally insulating layer is composed of a structure-providing char-forming flame-retardant fiber. Flame retardant fibers that form a char and provide structure to that char include high temperature fibers such as the aramids, fiberglass, melamines, PBI, oxidized PAN, novoloids, pre-oxidized fibers and carbon fibers. These are capable of forming a char having mechanical integrity that can remain in place to protect adjacent materials from the ignition source, and provide a structural support for char or other residue formed from other fibers blended with or otherwise combined therewith.

In some embodiments, both layers are composed of these high temperature fibers that are inherently flame and heat resistant and promote char formation and char integrity. Alternately, the fire barrier layer is composed of the structure-providing char-forming fibers and the thermally insulating layer is composed of fibers that promote char formation without the level of char integrity possessed by fibers of the fire barrier layer. In another alternative embodiment, the fire barrier layer has char-forming characteristics and the structure-providing char-forming fiber component is used in the thermally insulating layer.

The thermally insulating layer may be simply placed in contact with the fire barrier layer, or may be bonded or applied to the fire barrier layer by any of the widely used methods for joining two layers of textile fabrics, including needle punching the fiber into the fire barrier layer so that it becomes an integral part of it, joining the felt or batting to the fire barrier layer with an adhesive, or stitching, quilting, or stitch-bonding the two layers together. Integration of the fire barrier layer and the thermally insulating layer into one fabric may provide measurable improvement in the level of long-term durability of the fire barrier fabric as measured by Rollator (ASTM F1566) testing. Support by the fire barrier layer may lend stability to the nonwoven felt or batt and mitigate the effects of wear. Similarly, the presence of the fire barrier fabric may impart a measure of dimensional stability to the nonwoven thermally insulating layer. This improvement in dimensional stability may reduce necking or stretching of the fire barrier fabric during the quilting stage in the mattress manufacturing process. This is an additional benefit afforded by the present invention, and one that addresses a situation unique to the manufacture of mattresses and foundations.

Specific design parameters, such as weight of the finished fabric, weight of the fire barrier layer and of the thermally insulating layer, blend levels of fibers for each of the components and choice of textile construction, are not critical. Weight of the fire barrier layer typically ranges between 0.25 oz and 8 oz per square yard, and the weight of the applied fiber for the thermally insulating layer may be range between 1 oz per square yard and 20 oz per square yard in an effort to appropriately address the differing burning characteristics that may be present in the vertical and horizontal surfaces of the mattress and foundation. Since the protection levels required for different mattress constructions are based on the fuel load they represent, a range of configurations and combinations of elements that make up fire barrier fabrics, mattresses and mattress sets of the present invention is envisioned. A relatively low finished fabric weight containing fibers which do not perform at the highest level and therefore would not be at the high end of the cost spectrum may be appropriate for an inexpensive sleep set representing a minimal fuel load. A higher finished fabric weight and composition including very high-performing fibers at a higher cost may be appropriate protection for particularly challenging mattress constructions, such as an extra-thick, premium pillow-top constructions, overfilled with combustible materials in the quest for luxury and comfort. A particular composition appropriate for given circumstances is typically determined by full-scale testing of a mattress incorporating a proposed design. Ancillary considerations for design of a fire barrier fabric for use in fire resistant mattresses and mattress sets of the present invention include cost factors associated with raw material components and assembly methodologies, ability to integrate the fabric into existing production processes for mattress manufacturers, potential health hazard issues associate with the chemical makeup of raw materials used in the design and manufacture of the fire barrier fabric, durability of the fabric itself and of the mattress or mattress set once the fabric is incorporated into the finished mattress design, and the impact of the product on the comfort elements that are critical to market acceptance of the mattress or sleep surface.

Higher cost, higher performance fibers such as aramids, fiberglass, melamine and modacrylic, may be limited to the fire barrier layer, in order to engineer a fire barrier fabric that meets cost targets, as many of these fibers that may be used to form a char with strength and integrity may be prohibitively priced for the residential market. Utilization of lower cost, yet suitably performing fibers, to augment overall char formation and thermal insulation may effectively control overall cost. A typical embodiment of the fire barrier fabric of the present invention confines the most expensive raw material to the fire barrier layer. However, this is the component that has the highest levels of working loss due to yields and textile construction methodologies employed may be subject to higher production charges. A reduction in the cost of the fire barrier layer by reducing the amount of higher cost fiber used therein may be achieved without a loss of performance by increasing the weight of char-forming fibers in the thermal insulation layer.

It is not necessary that fire barrier fabrics according to the present invention be finished, that is bleached, dyed, scoured, heat-set, pre-shrunk, as these steps typically add cost to the finished product without any additional aesthetic benefit, as the fabric is typically concealed from view. Therefore, the greige state of the fabric is typically sufficient. However, if finishing were desired, such would not materially affect performance of the fabric. Hand of the fire barrier fabric typically does not compromise comfort elements of the sleep surface. Mattress manufacturers may employ objective measures of this using a process referred to as pressure mapping.

A typical design approach for residential mattresses is to localize comfort elements, such as polyurethane foams and battings, in the sleep surface areas (panels), with a minimum of fabric in the borders or sides. Accordingly, the fire barrier fabric according to the present invention at least partially encloses the core of the mattress, and the core may be fully enclosed, if desired, as flame retardant performance may be achieved without loft or thickness being so high as to hinder the ability of the mattress manufacturer to completely encapsulate the fuel load with the fire barrier fabric. In addition, the weight and composition of the fire barrier layer and the thermally insulating layer may be varied in order to address the burning and combustion challenges presented by a variety of mattress and mattress foundation designs. Fire barrier fabric having different compositions, typically varying according to weight of the fire barrier layer or the thermally insulating layer, may be used to cover different areas of the mattress or mattress foundation. For example, lighter weight and lower cost versions may be used as barriers for the horizontal surface area that is the panel or mattress top, while heavier weight and higher cost versions may be used to protect vertical surfaces, that is the borders or sides of the mattress for foundation. In general, design and financial resources for raw materials and assembly costs may be targeted to areas of the mattress and foundation that require a greater investment for fire protection. Individual pieces of the fire barrier fabric for the panel and/or border may be joined at the tape edge of the mattress with sewing thread specifically designed to withstand ignition, typically para-aramid or fiberglass sewing thread.

The fire barrier fabric may be placed under or disposed beneath a mattress ticking. Either the fire barrier layer or the thermally insulating layer may be placed in the outermost position, that is, in contact with the ticking. For example, a batting layer composed of fibers having a white color may be placed on the outside of a fabric layer composed of para-aramid or oxidized PAN fibers, in order to mask the gold or black color of these fibers. The fire barrier fabric may be simply placed adjacent to or in contact with the ticking using flame-retardant thread, or it may be bonded or attached to it. In particular, the fire barrier fabric may be conveniently quilted to the ticking, as mattresses for the residential market typically have decorative patterns stitched in the cover fabric or filling materials. This can be of benefit to mattress manufacturers, and only one feed position on quilting equipment may be required to add the fire barrier fabric during the quilting operation. Fire-retardant thread composed of FR fibers such as fiberglass or para-aramid may be used in the quilting operation.

The fire barrier fabric may also be designed to address variable flammability of decorative exterior cover and filling materials by including fibers that provide structure to the char formed therefrom, as the stitching of the quilt design may compress the barrier elements, resulting in a point of weakness. Therefore, fibers that yield a char having structural integrity may be used to bridge this area of compression and promote survival of the flame barrier and thermal protection.

Flame-retardant mattresses and mattress sets according to the present invention typically perform favorably when tested under the full-scale protocols set forth in applicable fire resistance codes, such as NFPA 701 and California Technical Bulletin #117, and even under the more demanding protocols set forth in California Technical Bulletin #129, NFPA 101 Life Safety Code 2000, NFPA 267, ASTM E-1590, and UL 1895. That is, a mattress or mattress set according to the present invention typically has a maximum heat release of less than 250 kW and a total energy release of less that 40 MJ in the first five minutes of the TB 129 test, or its equivalents. In some embodiments, the mattress or mattress set may earn a 'pass' rating when tested under the same protocol, having a weight loss due to combustion of less than 3 pounds in the first ten minutes of the test, maximum heat release of less than 100 kW and total heat release of less that 25 MJ in the first ten minutes of the test.

EXAMPLES

Example 1

Fabric Manufacture

A variety of woven and nonwoven fire barrier fabrics were manufactured. To this fabric, a blend of fibers was applied by feeding the substrate into a machine that needle punched the fiber blend to the substrate. Compositions of the fire barrier fabrics manufactured is listed in Table 1:

TABLE 1

| | Fire Barrier Layer | | Thermally Insulating Layer | | |
|---|---|---|---|---|---|
| Ex. no. | Fabric type | Weight, oz/yd | Fabric Composition | Weight, oz/yd | Composition |
| 1.1 | plain weave | 4.0 | 85/15, KANECRON ®/ KEVLAR ® | 6, 8, 10 | 67/33 VISIL ®/ KANECRON ® |
| 1.2 | warp knit/weft inserted | 4.4 | 85/15 KANECRON ®/KEVLAR ® | 6, 8, 10 | SAME |
| 1.3 | circular knit | 4.5 | 85/15, KANECRON ®/KEVLAR ® | 6, 8, 10 | SAME |
| 1.4 | woven | 2 | fiberglass | 6 | SAME |
| 1.5 | SpunLace (hydro-entangled) | 2 | 50/50, VISIL ®/KEVLAR ® | 6, 8, 10 | SAME |

KEVLAR ® is a para aramid fiber available from DuPont
KANECRON ® is a modacrylic fiber obtained from Kaneka Corporation
VISIL ® is a FR-viscose fiber obtained from Sateri OY, Valkeakoski Finland Example 2

Full-Scale Open Flame Testing

Procedure

Mattresses or mattress sets were fabricated as indicated in Table 2, and tested in accordance with TB 129. All instrumentation was zeroed, and calibrated prior to testing. The test specimen, after conditioning to 73° F. and 50% R.H., was placed on a steel frame, on a load cell platform along the far side of the test room (Configuration A). The specified propane burner was placed centrally and parallel to the bottom horizontal surface of the mattress 1 inch from the vertical side panel of the mattress. The computer data acquisition system was started, and then the burner was ignited and allowed to burn for 180 seconds. The test was continued until either all combustion ceased, or one hour passed.

Data recorded included: room smoke opacity; weight loss; smoke release rate (SRR); total smoke release (TSR); carbon monoxide concentration; heat release rate (HRR); total heat release (THR); ceiling temperature above specimen; and temperature at 4 feet above floor, 3 feet out from center of specimen

TABLE 2

TB 129 Test Results - Full-scale Mattress or Mattress/Foundation

| | Description of Specimen | | | | |
|---|---|---|---|---|---|
| Example No. | Fire Barrier | Mattress Type | Foundation? | Results | Comments |
| 2.1 | NONE | Std residential | YES | FAIL | This is a standard residential mattress and mattress foundation construction. This sleep set DID NOT incorporate any fire barrier protection. At 5 min 06 sec into the test protocol, this set of bedding reached an energy release level in excess of 1700 kW - the point of flashover for the test chamber - and the test was terminated. |
| 2.2 | fabric only | Std residential | NO | PASS | A standard residential mattress ONLY (without foundation) was built incorporating a fire barrier fabric only and NO stand-alone thermal insulation (thermally insulating batting) was built. Featuring a greatly reduced fuel relative to more challenging constructions, this design successfully passed the TB #129 testing with a peak HRR of only 33.21 kW and all burning ceased within 24 minutes. |
| 2.3 | fabric only | Std residential | YES | FAIL | The same mattress as built above in example 2.2 was |

TABLE 2-continued

TB 129 Test Results - Full-scale Mattress or Mattress/Foundation

| Example No. | Fire Barrier | Mattress Type | Foundation? | Results | Comments |
|---|---|---|---|---|---|
| | | | | | now tested with a mattress foundation. The foundation was protected in the border with a fire barrier fabric only. The dynamic created by the mere addition of a protected foundation resulted in a failing test result with a peak HRR of more than 1000 kW and flashover reached within 27 minutes. |
| 2.4 | thermally insulating batting only | Std residential | YES | FAIL | This standard residential mattress and mattress foundation construction incorporated fire barrier protection provided by a thermally insulating batting. At 53 min 36 sec into the test protocol, this set of bedding reached the failing point of the test and commenced to burn vigorously. Key failure points in review of the videotape were evident in the areas that the non-woven barrier was compressed by the quilting threads and subsequently burned through, breaching the barrier performance. |
| 2.5 | thermally insulating batting only | Std residential 1 | YES | FAIL | This standard residential mattress and mattress foundation construction incorporated fire barrier protection provided by a thermally insulating batting. At 59 min 30 sec into the test protocol, this set of bedding reached the failing point of the test and commenced to burn vigorously. Key failure points in review of the videotape were evident in the areas that the non-woven barrier was compressed by the quilting threads and subsequently burned through, breaching the barrier performance. |
| 2.6 | fire barrier fabric and thermally insulating batting | Pillow-top | YES | PASS | A pillow-top sleep set - featuring some of the higher degree of fuel load component and fire hazard potential was built using an embodiment of the invention. The passing result was achieved and an energy release with a peak HRR of 41.46 kW was delivered. |
| 2.7 | fire barrier fabric and thermally insulating batting | Pillow-top | YES | PASS | A pillow-top sleep set, featuring some of the higher degree of fuel load component and fire hazard potential, was built using an embodiment of the invention. An energy release with a peak HRR of 53.36 kW was delivered. |

A fire barrier fabric according to the present invention may also be used in other applications where it is desired to protect an upholstered or otherwise padded or filled article from heat of flames. Examples of applications include upholstered furniture and transportation and health care seating systems, where filling materials may be partly or completely enclosed by a fire barrier fabric according to the invention. Transportation seating systems include seats for airplanes, trains and buses and health care seating systems include seats or cushions for wheelchairs. Another example is protective apparel, such as firefighter turnout gear, where the filling materials may be covered by a fire barrier fabric. Performance of upholstered materials may be evaluated using the protocol set forth in California Technical Bulletin 133.

What is claimed is:

1. An open flame resistant mattress comprising a fire barrier textile at least partially enclosing a core of said mattress, said fire barrier textile comprising a fire barrier fabric layer and a thermally insulating fabric layer, said fire barrier fabric layer and thermally insulating fabric layer independently comprising at least one char-forming flame-retardant fiber; wherein said mattress, when tested in accordance with NFPA 267 or ASTM E 1590, has a maximum heat release rate of less than 250 kW and a total energy release of less than 40 MJ in the first five minutes of the test.

2. An open flame resistant mattress according to claim 1, wherein maximum heat release is less than 100 kW, total heat release is less that 25 MJ in the first ten minutes of the test and weight loss due to combustion is less than 3 pounds in the first ten minutes of the test.

3. An open flame resistant mattress according to claim 1, wherein said at least one char-forming flame-retardant fiber is selected from para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, and flame-retardant treated cotton fibers.

4. An open flame resistant mattress according to claim 1, wherein said at least one char-forming flame-retardant fiber is selected from para-aramid fibers, modacrylic fibers, flame-retardant viscose fibers, fiberglass and blends thereof.

5. An open flame resistant mattress according to claim 1, wherein said at least one char-forming flame-retardant fiber comprises a para-aramid fiber.

6. An open flame resistant mattress according to claim 1, wherein said at least one char-forming flame-retardant fiber comprises a brand of para-aramid and modacrylic fibers.

7. An open flame resistant mattress according to claim 1, wherein said at least one char-forming flame-retardant fiber comprises a blend of para-aramid and flame-retardant viscose fibers.

8. An open flame resistant mattress according to claim 1, wherein said thermally insulating fabric layer comprises a blend of flame-retardant viscose and modacrylic fibers.

9. An open flame resistant mattress according to claim 1, wherein said at least one char-forming flame-retardant fiber comprises fiberglass.

10. An open flame resistant mattress according to claim 1, wherein at least one of said fire barrier fabric layer and said thermally insulating fabric layer comprises at least one structure-providing char-forming flame-retardant fiber.

11. An open flame resistant mattress according to claim 10, wherein said at least one structure-providing char-forming flame-retardant fiber is selected from para-aramid fibers, meta-aramid fibers, fiberglass, melamine fibers, poly-benzimidazole fibers, polyacrylonitrile fibers, novoloid fibers, pre-oxidized fibers, and carbon fibers.

12. An open flame resistant mattress according to claim 9, wherein said at least one structure-providing char-forming flame-retardant fiber is selected from para-aramid fibers, fiberglass and blends thereof.

13. An open flame resistant mattress according to claim 1, wherein said fire barrier fabric layer comprises fiberglass.

14. An open flame resistant mattress according to claim 1, wherein said thermally insulating fabric layer is bonded to the fire barrier fabric layer.

15. An open flame resistant mattress according to claim 14, wherein said thermally insulating fabric layer is bonded to the fire barrier fabric layer by needle punching.

16. An open flame resistant mattress according to claim 14, wherein said composite fire barrier fabric is stitched to the mattress ticking.

17. An open flame resistant mattress set comprising a mattress according to claim 1 and a mattress foundation;

wherein said mattress set, when tested in accordance with NFPA 267 or ASTM E 1590, has a maximum heat release rate of less than 250 kW and a total energy release of less than 40 MJ in the first five minutes of the test.

18. An open flame resistant mattress set according to claim 17, wherein said mattress foundation is at least partially enclosed by said composite-fire barrier textile.

19. An open flame resistant mattress set according to claim 17, wherein maximum heat release is less than 100 kW, total heat release is less that 25 MJ in the first ten minutes of the test and weight loss due to combustion is less than 3 pounds in the first ten minutes of the test.

20. An open flame resistant mattress set according to claim 17, wherein said at least one char-forming flame-retardant fiber is selected from para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, and flame-retardant treated cotton fibers.

21. An open flame resistant mattress set according to claim 17, wherein said at least one char-forming flame-retardant fiber is selected from para-aramid fibers, modacrylic fibers, flame-retardant viscose fibers, fiberglass and blends thereof.

22. An open flame resistant mattress set according to claim 17, wherein said at least one char-forming flame-retardant fiber comprises a para-aramid fiber.

23. An open flame resistant mattress set according to claim 17, wherein said at least one char-forming flame-retardant fiber comprises a blend of para-aramid and modacrylic fibers.

24. An open flame resistant mattress set according to claim 17, wherein said at least one char-forming flame-retardant fiber comprises a blend of para-aramid and flame-retardant viscose fibers.

25. An open flame resistant mattress set according to claim 17, wherein said thermally insulating fabric layer comprises a blend of flame-retardant viscose and modacrylic fibers.

26. An open flame resistant mattress set according to claim 17, wherein said at least one char-forming flame-retardant fiber comprises fiberglass.

27. An open flame resistant mattress set according to claim 17, wherein at least one of said fire barrier fabric layer and said thermally insulating fabric layer comprises at least one structure-providing char-forming flame-retardant fiber.

28. An open flame resistant mattress set according to claim 27, wherein said at least one structure-providing char-forming flame-retardant fiber is selected from para-aramid fibers, meta-aramid fibers, fiberglass, melamine fibers, poly-benzimidazole fibers, polyacrylonitrile fibers, novoloid fibers, pre-oxidized fibers, and carbon fibers.

29. An open flame resistant mattress set according to claim 28, wherein said at least one structure-providing char-forming flame-retardant fiber is selected from para-aramid fibers, modacrylic fibers fiberglass and blends thereof.

30. An open flame resistant mattress set according to claim 17, wherein said fire barrier fabric layer comprises fiberglass.

* * * * *

UNITED STATES PATENT AND TRADEMARK OFFICE
CERTIFICATE OF CORRECTION

PATENT NO. : 6,823,548 B2
DATED : November 30, 2004
INVENTOR(S) : Murphy et al.

It is certified that error appears in the above-identified patent and that said Letters Patent is hereby corrected as shown below:

Column 13,
Line 42, delete the word "brand" and insert -- blend --

Column 14,
Line 21, delete "composite-" before the word "fire"

Signed and Sealed this

First Day of March, 2005

JON W. DUDAS
*Director of the United States Patent and Trademark Office*